(12) United States Patent
Blayvas

(10) Patent No.: US 9,103,666 B2
(45) Date of Patent: *Aug. 11, 2015

(54) COMPACT 3D SCANNER WITH FIXED PATTERN PROJECTOR AND DUAL BAND IMAGE SENSOR

(71) Applicant: Technion Research and Development Foundation, Ltd., Technion, Haifa (IL)

(72) Inventor: Ilya Blayvas, Jerusalem (IL)

( * ) Notice: Subject to any disclaimer, the term of this patent is extended or adjusted under 35 U.S.C. 154(b) by 0 days.

This patent is subject to a terminal disclaimer.

(21) Appl. No.: 14/156,711

(22) Filed: Jan. 16, 2014

(65) Prior Publication Data

US 2014/0132730 A1    May 15, 2014

Related U.S. Application Data

(63) Continuation of application No. 11/750,029, filed on May 17, 2007, now Pat. No. 8,659,698.

(51) Int. Cl.
*H04N 5/222* (2006.01)
*G01B 11/25* (2006.01)
*G06T 7/00* (2006.01)
*H04N 7/18* (2006.01)

(52) U.S. Cl.
CPC ............ *G01B 11/25* (2013.01); *G01B 11/2509* (2013.01); *G06T 7/0057* (2013.01)

(58) Field of Classification Search
CPC .. G01B 11/25; G01B 11/2509; G06T 7/0057; H04N 5/2256; H04N 5/2352
USPC .......................................... 348/135, 275, 370
See application file for complete search history.

(56) References Cited

U.S. PATENT DOCUMENTS

| 6,252,623 | B1 | 6/2001 | Lu |
| 6,369,899 | B1 | 4/2002 | Hamada |
| 6,438,272 | B1 | 8/2002 | Huang |
| 6,559,954 | B2 | 5/2003 | Takata |
| 6,759,646 | B1 | 7/2004 | Acharya |
| 6,937,348 | B2 | 8/2005 | Geng |
| 7,092,563 | B2 | 8/2006 | Shiratani |
| 7,274,393 | B2 | 9/2007 | Acharya |
| 7,349,104 | B2 | 3/2008 | Geng |
| 7,388,679 | B2 | 6/2008 | Yoshino |
| 7,525,669 | B1 | 4/2009 | Abdollahi |
| 7,564,019 | B2 | 7/2009 | Olsen |
| 7,566,855 | B2 | 7/2009 | Olsen |
| 7,576,845 | B2 | 8/2009 | Asakura |
| 7,684,052 | B2 | 3/2010 | Suwa |
| 8,134,637 | B2 | 3/2012 | Rossbach |
| 8,139,141 | B2 | 3/2012 | Bamji |
| 8,198,574 | B2 | 6/2012 | Olsen |
| 8,243,285 | B2 | 8/2012 | Fishbaine |
| 2004/0085448 | A1 | 5/2004 | Goto |
| 2008/0055246 | A1 | 3/2008 | Okayama |

*Primary Examiner* — Ngoc-Yen Vu
(74) *Attorney, Agent, or Firm* — Trop, Pruner & Hu, P.C.

(57) ABSTRACT

A structured light 3D scanner consisting of a specially designed fixed pattern projector and a camera with a specially designed image sensor is disclosed. A fixed pattern projector has a single fixed pattern mask of sine-like modulated transparency and three infrared LEDs behind the pattern mask; switching between the LEDs shifts the projected patterns. An image sensor has pixels sensitive in the visual band, for acquisition of conventional image and the pixels sensitive in the infrared band, for the depth acquisition.

18 Claims, 4 Drawing Sheets

A filter arrangement on the color CMOS image sensor or color CCD, according to one of the embodiments of the present invention.

| R | G | R | G | R | G | ... |
|---|---|---|---|---|---|---|
| B | IR | B | IR | B | IR | ... |
| R | G | R | G | R | G | ... |
| B | IR | B | IR | B | IR | ... |
| R | G | R | G | R | G | ... |
| B | IR | B | IR | B | IR | ... |

FIG 3. A filter arrangement on the color CMOS image sensor or color CCD, according to one of the embodiments of the present invention.

| C | M | C | M | C | M | ... |
|---|---|---|---|---|---|---|
| Y | IR | Y | IR | Y | IR | ... |
| C | M | C | M | C | M | ... |
| Y | IR | Y | IR | Y | IR | ... |
| C | M | C | M | C | M | ... |
| Y | IR | Y | IR | Y | IR | ... |

FIG 4. A complementary color filter arrangement on the color CMOS image sensor or color CCD, according to one of the embodiments of the present invention.

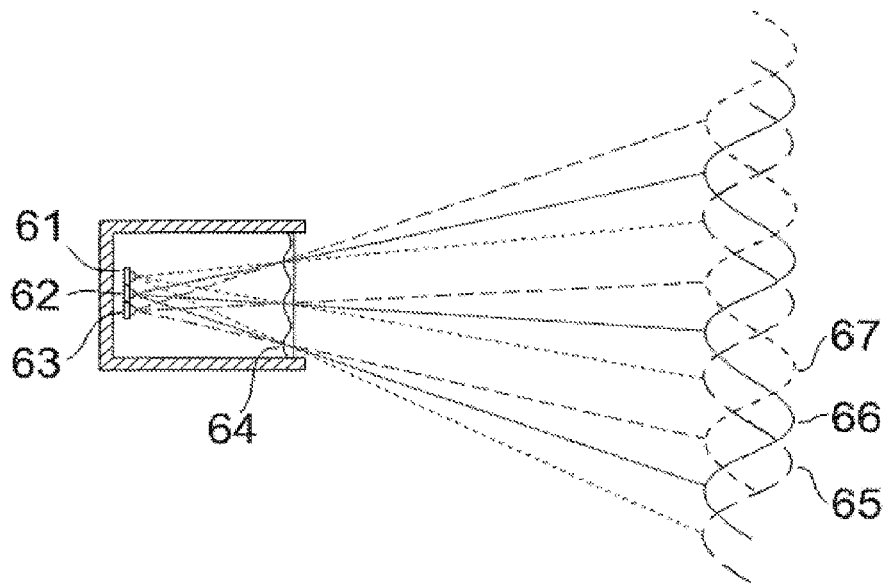
FIG 5. A filter arrangement on the gray level CMOS image sensor or gray level CCD, according to one of the embodiments of the present invention.
FIG. 6. A scheme of the fixed pattern projector, according to the present invention.

COMPACT 3D SCANNER WITH FIXED PATTERN PROJECTOR AND DUAL BAND IMAGE SENSOR

CROSS REFERENCE TO RELATED APPLICATIONS

This is a continuation application based on non-provisional application Ser. No. 11/750,029 filed May 17, 2007, hereby expressly incorporated by reference herein.

BACKGROUND

This invention belongs to the field of structured light 3D scanners. 3D scanners acquire a three dimensional shape of the object and are used in multiple applications, such as: Security applications, where a 3D scan of the face is performed for the sake of further face recognition [1]; Medical applications, such as 3D scanning of the dental area (U.S. Pat. No. 5,386,292); robot navigation (U.S. Pat. No. 4,611,292); Numerous other established and emerging applications.

Conventional image is a projection of a three dimensional scene onto a two dimensional image plane, and therefore the depth information is lost. Consider FIG. 1. A point C on the image sensor 16 of the camera 14 may correspond to either point A or point B, or any other point, lying on the ray 17.

A structured light 3D scanner consists of two main parts: a pattern projector and a camera. A pattern projector projects one or more patterns onto the object. The patterns are designed to allow determining the corresponding projector ray from the acquired images. Knowing that point C corresponds to projector ray 18, allows determining the distance to the point A by triangulation.

The projected patterns can be in the visible or infrared band. If the projected patterns are in the visible band, then an uncontrolled ambient illumination may interfere with the pattern, reducing the system accuracy, the projected pattern hinders the simultaneous acquisition of conventional image. In the security applications, like 3D scanning of the human faces, a pattern in the visible band disturbs the scanned individuals and gives away the system operation.

The projected patterns in the infrared band allow overcoming the above limitations. However, use of the infrared illumination requires use of a special infrared-sensitive camera, and therefore a simultaneous acquisition of the image in the visible band requires an additional camera. This increases the size, weight and cost of a 3D scanning system.

The projected patterns in the prior art are usually generated by the digital light projector [1,2]. FIG. 7 shows an infrared structured light 3D scanner in the prior art. A digital light projector 71 generates the patterns, an infrared filter 72 cuts off the visible band, and transmits only the infrared patterns; a signal reflected from the object 73 is divided by a semitransparent mirror 74 between the infrared camera 75, acquiring the patterns and the visible band camera 76, acquiring conventional images. This system is relatively expensive, bulky, and energy consuming, which prohibits many applications of the prior art 3D scanners.

The object of this invention is to provide a design of a structured light 3D scanner, comparable in the size and manufacturing cost with the simplest webcams, and possessing the webcam functionality. In other words the object of this invention is to add a 3D scanner functionality to a webcam, with only negligible increase of its size and manufacturing cost.

The present invention is a structured light 3D scanner, consisting of a camera with a specially designed image sensor and a specially designed pattern projector. An image sensor is designed so, that some of its pixels are sensitive in the visual band, while some other pixels are sensitive in the infrared band. This allows acquiring a conventional image and a stealth 3D scan in the infrared band by a single camera in the system.

In prior art color image sensors, the green pixels are redundant, since for each one blue and one red pixel there are two green pixels, as shown on FIG. 2. Therefore, converting one of the green pixels into the infrared pixel does not decrease the sensor resolution. The infrared sensitive pixels are created via the deposition of infrared transmitting filter.

When the image is acquired by an invented image sensor, the information from the visible band pixels is used to construct a conventional image, while the information from the infrared pixels is used to construct an infrared image. We call an invented image sensor a "dual band" image sensor, since it simultaneously acquires images in the infrared and in the visible bands. The dual band image sensor requires only one additional type of filter, and its manufacturing cost is only negligibly higher than the manufacturing cost of conventional sensor. Use of dual-band image sensor does not requires a change of the camera design, since it has the same interface with the camera as the conventional image sensor; the camera acquires the full frame picture, containing both the infrared and the visible band pixels, which are discriminated in the image processing.

An invented fixed pattern projector has a single pattern mask and several LEDs behind it. Switching between the LEDs shifts the projected pattern, as shown on FIG. 6. One of the particularly efficient patterns for structured light 3D scanners is a set of three phase-shifted sine patterns ([2], U.S. Pat. No. 6,559,954, U.S. Pat. No. 6,438,272). In specific embodiment of this invention, three phase shifted sine patterns are generated by a pattern mask with sine profile on it and three infrared LEDs behind the mask. The invented projector is compact, measuring only several millimeters in each dimension and has low manufacturing cost.

The 3D scanner using the disclosed designs of the dual-band image sensor and the fixed pattern projector has functionality of a conventional camera and an infrared 3D scanner, while its size and manufacturing cost are almost same as of the camera alone.

BRIEF DESCRIPTION OF THE DRAWINGS

Some embodiments are described with respect to the following figures:

FIG. 3 shows a filter arrangement on the dual-band color CMOS image sensor or dual-band color CCD, according to one of the embodiments of the present invention.

FIG. 4 shows a filter arrangement in complementary colors on the dual-band color CMOS image sensor or dual-band color CCD, according to one of the embodiments of the present invention.

FIG. 5 shows a filter arrangement on the gray level CMOS image sensor or gray level CCD, according to one of the embodiments of the present invention.

FIG. 6 shows a scheme of the fixed pattern projector, according to the present invention.

DETAILED DESCRIPTION

Figures 1, 2:
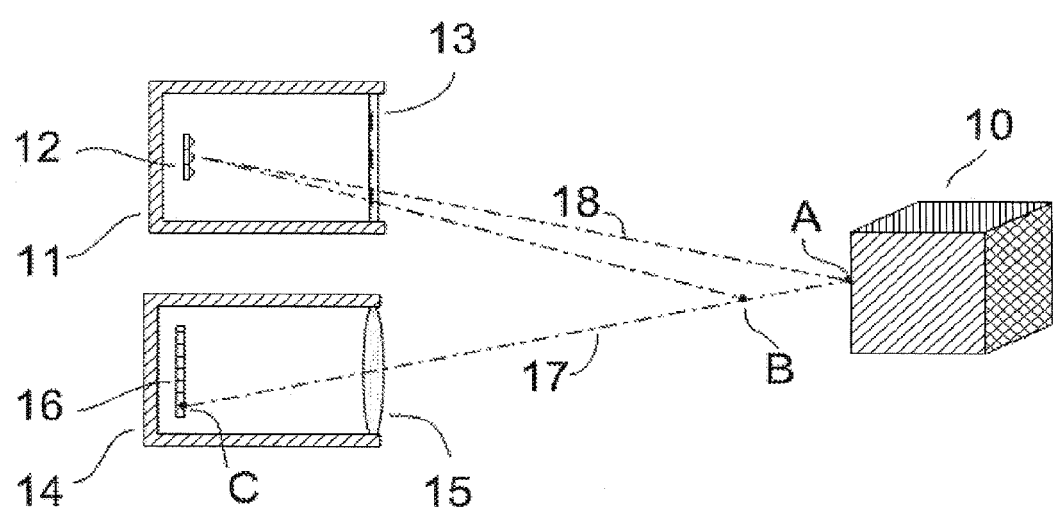
FIG. 1 shows a scheme of structured light 3D scanner, according to the present invention.
FIG. 2 shows a typical filter arrangement on the color CMOS image sensor or color CCD, according to the prior art.
Figure 7:
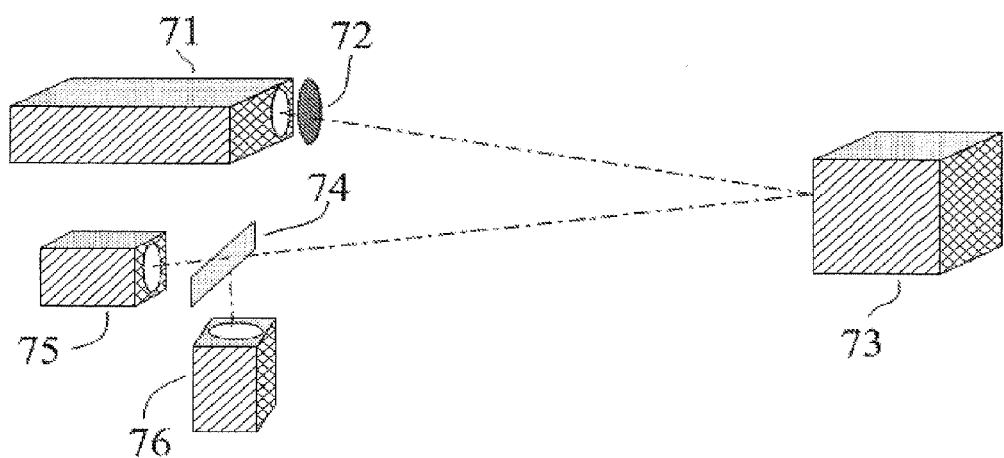
FIG. 7 shows a scheme of the infrared structured light 3D scanning system, according to the prior art.

FIG. 1 shows a 3D scanner consisting of a pattern projector 11 and a camera 14. The pattern projector 11 consists of several infrared light emitting diodes 12 and a pattern mask 13. The camera 14 has a lens 15 and an image sensor 16. The 3D scanner operates as follows: the first infrared LED turns on, and projects a first pattern through the pattern mask 13 on the object 17. The image of the object and the first infrared pattern projected on it is focused by the lens 15 on the image sensor 16. The image sensor has pixels sensitive to the visible band and to the infrared band. The pixels sensitive to the visible band acquire the conventional image of the object under the natural illumination. The pixels sensitive to the infrared acquire the infrared image of object with the infrared pattern projected on it. Then the first LED is switched off and the second LED is switched on, projecting the second pattern. The second image is acquired with the pixels in the visible band containing conventional image of the object and the infrared pixels containing the image of the second infrared pattern. This process is repeated n times (where n is one or more), for each of the n LEDs. At the end of the process there are n images of the object in the visible band under natural illumination, and n images in the infrared band, with the object illuminated by n different (or shifted) infrared patterns. Processing of the infrared images, allows reconstruction of the 3D shape of the object. Conventional images of the object from the visible band allow simultaneous use of the system as a conventional camera, for example as a conventional webcam.

FIG. 2 shows one of the embodiments of the prior art color CMOS image sensor or CCD. The color filters are arranged in the repeated 2.times.2 groups, with one red, two green and one blue filter in each group. 21 shows such a 2.times.2 group. R denotes a red filter, G denotes a green filter, and B denotes a blue filter.

FIG. 3 shows one of the embodiments of an invented dual-band CMOS image sensor or dual-band color CCD. R denotes a red filter, G denotes a green filter, B denotes a blue filter, IR denotes an infrared filter, transmitting in the infrared and absorbing in the visible band. Replacement of one of the green pixels with the infrared pixel, (R, G, G, B).fwdarw.(R, G, B, IR) preserves the color information, since the replaced second green pixel was redundant.

FIG. 4 shows another embodiment of an invented dual-band CMOS image sensor or dual-band color CCD. C denotes a cyan filter, M denotes a magenta filter, Y denotes a yellow filter, IR denotes an infrared filter, transmitting in the infrared and absorbing in the visible band.

FIG. 5 shows the filter arrangement of the invented dual-band gray level CMOS image sensor or dual-band grey level CCD. B/W denotes a gray level pixel, sensitive to the visible band. IR denotes a pixel sensitive to the infrared band.

FIG. 6 shows one of the embodiments of an invented fixed pattern projector. When the LED 61 is switched on, the pattern mask 64 projects a pattern 65. When the LEDs 62 and 63 are switched on, the pattern mask 64 projects correspondingly patterns 66 and 67.

The pattern mask 64 has the transparency modulated by the singe wave with period D. The LEDs are vertically spaced by the distance D/3. Therefore, the projected sine patterns are mutually phase-shifted by $2\pi/3$. The infrared images acquired with the first, second and third projected patterns are denoted as $I_1$, $I_2$ and $I_3$. The phase $\phi$ of the projected pattern is obtained from the three images as: $\phi = \arctan[\sqrt{3}(I_1-I_3)/(2I_2-I_1-I_3)]$ [2], which can be verified via the trigonometric equalities. Knowing the phase $\phi$ of the projected pattern for each pixel allows the 3D reconstruction of the shape by triangulation [2].

What is claimed is:

1. A 3D scanner comprising:
   a camera comprising an image sensor, the image sensor comprising pixels sensitive in the visible optical band and pixels sensitive in the infrared optical band;
   a fixed pattern projector comprising a single fixed pattern mask, a plurality of visible light sources behind the single fixed pattern mask, and a plurality of infrared light sources behind the single fixed pattern mask;
   wherein said camera is configured to project patterns in the visible optical band on an object, project patterns in the infrared optical band on the object, acquire a plurality of visible images of the object, acquired a plurality of invisible images of the object, the camera further configured to simultaneously acquire a visible image and an infrared image;
   wherein the plurality of infrared light sources comprises three infrared light emitting diodes placed at distances D/3; and
   wherein the scanner is configured to vary the transparency of the single fixed pattern mask with a sine-function having a period D and the scanner is configured to sequentially switch between the three infrared light sources such that the sequential switching results in sequential projection of three sine-modulated patterns, mutually shifted by $2\pi/3$.

2. An apparatus comprising the 3D scanner of claim 1, the apparatus configured to reconstruct a 3D shape of the object based on the plurality of visible images or the plurality of infrared images.

3. The scanner according to claim 1, wherein said pixels sensitive in the visible band are tiled in an interlaced manner with said pixels sensitive in the invisible band.

4. The scanner according to claim 1, wherein said camera further comprises three types of color filters and fourth type of filter filtering in the infrared band.

5. The scanner according to claim 4, wherein said image sensor comprises a plurality of groups of pixels, each group of pixels having, in a two-by-two quadrangular arrangement, a pixel transmitting in the red, a pixel transmitting in the green, a pixel transmitting in the blue and a pixel transmitting in the infrared.

6. The scanner according to claim 4, wherein said image sensor comprises a plurality of groups of pixels, each group of pixels having, in a two-by-two quadrangular arrangement a pixel transmitting in the cyan, a pixel transmitting in the magenta, a pixel transmitting in the yellow and a pixel transmitting in the infrared.

7. The scanner according to claim 1, wherein said single pattern mask has a sine-like varying transparency.

8. A method comprising:
   using a camera comprising an image sensor, the image sensor comprising pixels sensitive in the visible optical band and pixels sensitive in the infrared optical band;
   projecting patterns in the visible optical band on the object;
   projecting patterns in the infrared optical band on the object using a fixed pattern projector comprising a single fixed pattern mask, a plurality of visible light sources behind the single fixed pattern mask, and a plurality of infrared light sources behind the fixed pattern mask comprising three infrared light emitting diodes placed at distances D/3;
   acquiring a plurality of visible images of the object;
   acquiring a plurality of invisible images of the object;
   simultaneously acquiring a visible image and an infrared image;
   varying the transparency of the single fixed pattern mask with a sine-function having a period D; and sequentially switching between the three infrared light sources such that the sequential switching results in sequential projection of three sine-modulated patterns, mutually phase shifted by $2\pi/3$.

9. The method according to claim 8 including reconstructing a 3D shape of the object based on the plurality of visible images or the plurality of infrared images.

10. The method according to claim 8, wherein said projecting said patterns is sequential.

11. The method according to claim 10, wherein said dual-band image sensor comprises a plurality of groups of pixels, each group of pixels having, in a two-by-two quadrangular arrangement, three pixels respectively transmitting in three different visible bands and one pixel transmitting in the invisible optical band.

12. The method according to claim 11, wherein said three different visible bands are selected from the group consisting of (i) red, green and blue optical bands, and (ii) cyan, magenta and yellow optical bands.

13. The method according to claim 11, wherein said invisible optical band comprises an infrared band.

14. One or more non-transitory computer readable media storing instructions to implement a sequence comprising:
projecting patterns in the invisible optical band on the object with the scanning apparatus of claim 1;
using a dual band image sensor having some pixels sensitive in the visible optical band and some other pixels sensitive in the invisible optical band for acquiring a visible light image of the object and an invisible light image of the object and said patterns with the scanning apparatus of claim 1; and
reconstructing the three-dimensional shape of the object based on said acquired patterns.

15. The medium according to claim 14, wherein said projecting said patterns is sequential.

16. The medium according to claim 15, wherein said dual-band image sensor comprises a plurality of groups of pixels, each group of pixels having, in a two-by-two quadrangular arrangement, three pixels respectively transmitting in three different visible bands and one pixel transmitting in the invisible optical band.

17. The medium according to claim 16, wherein said three different visible bands are selected from the group consisting of (i) red, green and blue optical bands, and (ii) cyan, magenta and yellow optical bands.

18. The medium according to claim 16, wherein said invisible optical band comprises an infrared band.

* * * * *